United States Patent [19]

Daily

[11] Patent Number: 5,559,695
[45] Date of Patent: Sep. 24, 1996

[54] APPARATUS AND METHOD FOR SELF-CALIBRATING VISUAL TIME-TO-CONTACT SENSOR

[75] Inventor: Michael J. Daily, Thousand Oaks, Calif.

[73] Assignee: Hughes Aircraft Company, Los Angeles, Calif.

[21] Appl. No.: 364,158

[22] Filed: Dec. 27, 1994

[51] Int. Cl.$^6$ .................................................. G06F 7/70
[52] U.S. Cl. .............. 364/424.01; 364/516; 364/424.02; 395/162; 395/81; 354/402; 354/140; 348/219; 348/355
[58] Field of Search ..................... 364/424.01, 424.02, 364/514, 516, 517, 468; 348/219, 116, 355, 349, 79, 347, 31, 229, 241, 220, 321, 14, 20, 15, 674; 395/162, 81–84, 94, 904–905; 226/15–20; 358/3, 442, 406, 455; 352/140; 354/402, 81, 400, 140

[56] References Cited

U.S. PATENT DOCUMENTS

| | | | |
|---|---|---|---|
| 4,152,061 | 5/1979 | Gordon | 354/400 |
| 4,236,794 | 12/1980 | Gordon | 354/402 |
| 4,789,940 | 12/1988 | Christian | 364/424.02 |
| 4,954,962 | 9/1990 | Evans, Jr. et al. | 364/513 |
| 5,036,474 | 7/1991 | Bhanu et al. | 364/516 |
| 5,101,277 | 3/1992 | Kanata | 348/349 |
| 5,170,352 | 12/1992 | McTamaney et al. | 364/424.02 |
| 5,307,170 | 4/1994 | Itsumi et al. | 348/219 |
| 5,400,383 | 3/1995 | Yassa et al. | 378/98.2 |
| 5,453,845 | 9/1995 | Nonoshita et al. | 358/442 |
| 5,460,312 | 10/1995 | Bräü et al. | 226/15 |

OTHER PUBLICATIONS

R. A. Brooks, et al, "Self Calibration of Motion and Stereo Vision for Mobile Robot Navigation", pp. 1–23, Mass. Inst. Tech. Artificial Intel. Lab., (Aug., 1987).

S. Neghdaripour, et al, "A Direct Method for Locating the Focus of Expansion", pp. 1–27, Mass. Inst. Tech. Artificial Intel. Lab., (Jan., 1987).

R. Y. Tsai, "A Versatile Camera Calibration Technique for High–Accuracy 3D Machine Vision Metrology Using Off–the–Shelf TV Cameras and Lenses", pp. 323–344, IEEE J. Robotics & Automation, vol. RA–3, No. 4, (Aug., 1987).

M. J. Dailey, "Self–Calibration of a Multi–Camera Vision System", 24th Asilomar Conference on Signals, Systems and Computers, Nov. 5–7, 1990, vol. 2 of 2, pp. 810–815.

(List continued on next page.)

*Primary Examiner*—Kevin J. Teska
*Assistant Examiner*—Jacques Louis-Jacques
*Attorney, Agent, or Firm*—V. D. Duraiswamy; W. K. Denson-Low

[57] ABSTRACT

The invention relates to a method and a self-calibrating visual time-to-contact (TTC) sensor for a mobile manned or autonomous unmanned vehicle which operates in a high speed manner and which permits the continuous, adaptive motion of the vehicle through the vehicle's environment. More specifically, the invention relates to an apparatus and method for novel use of active sensor control for aligning a camera, mounted on the vehicle, to track the direction of motion of the vehicle in order to successfully navigate in complex environments and to simplify difficult processing steps previously attempted through algorithmic means. Rather than attempting to explicitly find a focus of expansion (FOE) from image data, the invention continuously calibrates the sensor to point in the direction of the FOE, using weighted global average of the horizontal and vertical component of the optical flow. The pan and tilt angles of the visual TTC sensor are iteratively changed by the scanning mechanism in the opposite direction by small increments, biased by the global magnitude of the optical flow. In this way, the visual TTC sensor is not constrained to point in any direction at the start, and after several iterations it will point near the FOE and continue to do so as the vehicle moves. By actively centering the FOE in the image sequence, better accuracy is possible. By avoiding the focus of expansion calculation, the method becomes self-calibrating and it is faster and more robust to vibrations and sensor misalignments occurring in changing and complex indoor or outdoor environments.

21 Claims, 6 Drawing Sheets

OTHER PUBLICATIONS

B. K. P. Horn, et al, "Direct Methods of Recovering Motion", International J. of Computer Visions, 2, pp. 51–76, Jan. 1988.

T. Poggio, et al, "Green Theorems and Qualitative Properties of the Optical Flow", Mass. Inst. of Tech. Artifical Intel. Lab. and Ctr. for Biological Info. Processing, A.I. Memo No. 1289, C.B.I.. Paper No. 29, 13 pages including cover sheet, pp. 1–6 and figures 1A, 1B, 2A, 2B and 3A, 3B Apr. 1991.

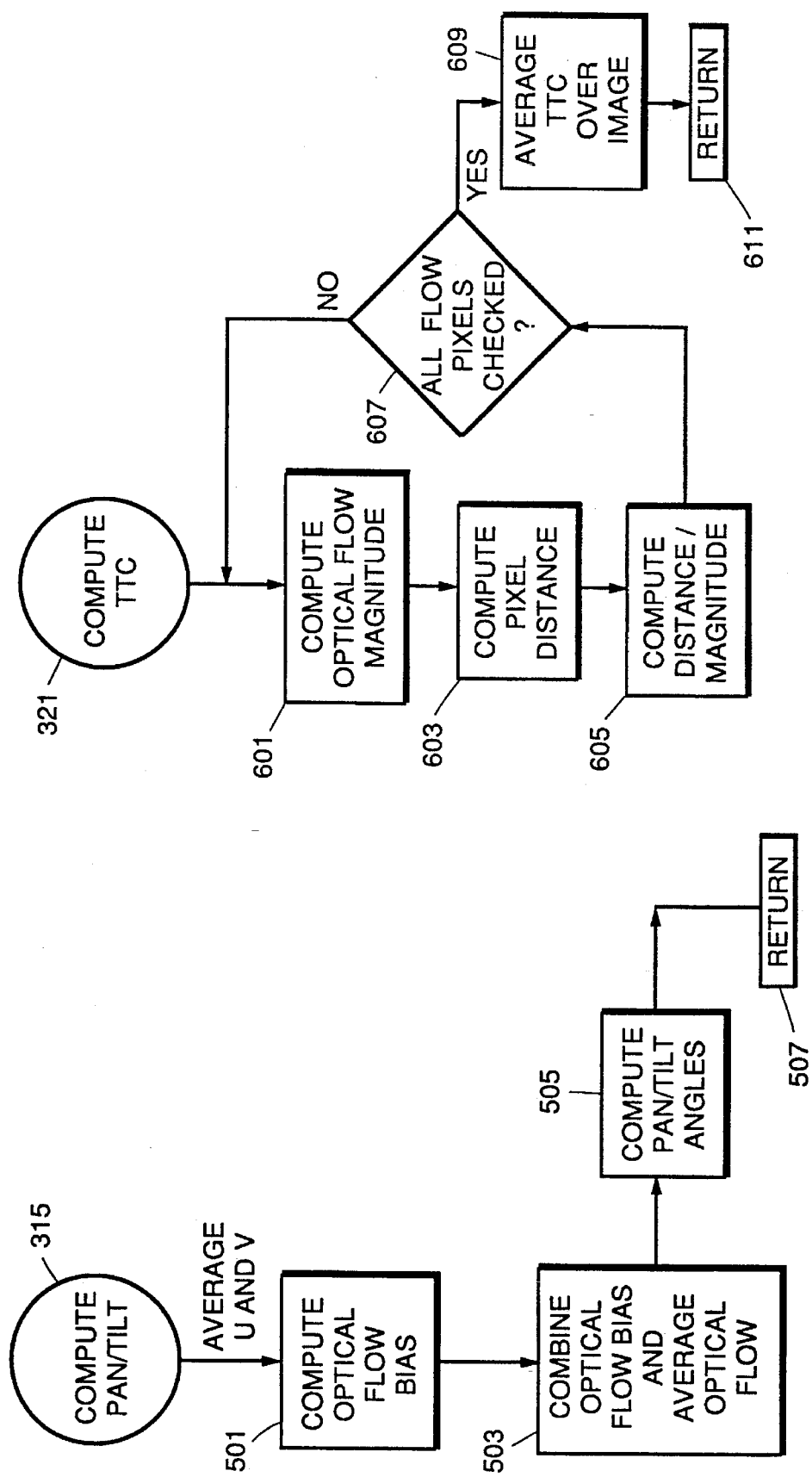

APPARATUS AND METHOD FOR SELF-CALIBRATING VISUAL TIME-TO-CONTACT SENSOR

BACKGROUND OF THE INVENTION

1. Field of the Invention

This invention relates generally to an apparatus and method for real-time, adaptive, self-calibration of a visual time-to-contact sensor, mounted on a manned or mobile vehicle, to predict the time-to-contact with stationary and moving obstacles in a moving vehicle's immediate path. More particularly, the invention relates to an apparatus and method for a self-calibrating visual time-to-contact sensor, actively centering the focus of expansion (FOE) in the image sequence, using optical flow, and continuously calibrating the pan and tilt of the sensor to point in the direction of the FOE, in order to accurately predict the time-to-contact with stationary and moving obstacles in a moving vehicle's immediate path, and enable warning or evasive action.

2. Description of the Related Prior Art

The present invention relates to a real-time navigation and obstacle avoidance vision system for a manned or autonomous moving vehicle and, in particular, to a vision system which includes an apparatus and a method for camera alignment along the direction of motion in order to control vehicle's movement, enabling warning or evasive action, and with the ability to accurately predict the time-to-contact with stationary and moving obstacles in a moving vehicle's immediate path.

In the case of an autonomous vehicle, the vehicle typically includes some type of a sensor system for sensing and detecting obstacles within the path of the robot so that the appropriate action may be taken. This action may include altering the path of the robot in order to get around the obstacle. Systems employing ultrasonic detectors, mechanical contact devices and laser ranging apparati are known in the art. Other systems, which include a camera to observe the environment and a passive image processing system, are also known.

The field of computer vision includes the computer analysis of scenes projected into an electronic camera. The camera generates images of the scenes, and a computer analyzes these images and draws useful conclusions. The complexity of the relationships challenges real-time functioning because of the sophisticated and complex mathematical relationships which require additional processing time. Traditional, passive scene analysis vision systems, require large mounts of computing power, are relatively slow and often yield erroneous results. Typically, the interpretation of data is too slow to be useful for real-time navigation and may result in navigation errors.

Conventionally, various image control devices have been proposed in order to automatically move a vehicle or a robot in an autonomous manner. They include digitizing images from a forward looking camera mounted on the vehicle body and changing a course according to the received image. However, control of a robot course while the body is moving is very difficult and requires evaluation of a plurality of images obtained from the camera, wherein each set of data is obtained at a different time and position.

A serious shortcoming of almost all known computer vision robotic and navigation systems, especially with regard to low cost commercial systems, is that some son of pre-known relationship, correlation, or calibration must be made between the major components of the system and the environment in which the robot operates. One example is U.S. Pat. No. 4,789,940 to Christian, entitled "Method and Apparatus For Filtering Reflections From Direct Images For Mobile Robot Navigation". In this patent, a camera is viewing an area and keeping track of mobile robots so that their movement can be controlled by a control system. A limitation of this system is that the area of movement and the field of view of the camera must be carefully pre-calibrated since the camera is always in a predetermined known position. Movement of robots is directed in the two dimensional plane of the surface, which precludes its use with wheeled or "nonholonomic" robots.

In general, self-calibrating visual time-to-contact sensors have been developed for use in the autonomously moving unmanned systems, including ground and air vehicles, and in automotive and robot applications. Therefore, these systems need to have the ability to accurately and quickly predict the time-to-contact with stationary and moving obstacles in the vehicle's immediate path, enabling evasive action. They also have to be compact in size, with low power hardware implementation and low cost.

Conventionally, there are numerous calibration techniques used, divided into two groups: one-time, high-accuracy parameters calculation methods; and, task-oriented, coarse, inexact calibration methods. The high-accuracy methods use algorithms for computing the focus of expansion (FOE) of a sensor pointed in the direction of motion of a vehicle (Ballard, D. H. and C. M. Brown, "Computer Vision," Prentice Hall Inc., 1982; Brooks, R. A., A. M. Flynn, and T. Marill, "Self-calibration of Motion and Stereo Vision for Mobile Robot Navigation," MIT AI Lab, AI Memo 984, August, 1987; Negahdaripour, S. and B. K. P. Horn, "A Direct Method for Locating the Focus of Expansion," MIT AI Lab, AI Memo 939, January, 1987; Tsai, R. Y. "A Versatile Camera Calibration Technique for High-Accuracy 3D Machine Vision Metrology Using Off-the-Shelf TV Cameras and Lenses," IEEE JRA, RA-3(4): 323–344, 1987). These methods often rely on accurate computation of the optical flow, and in some cases use specific assumptions about the environment or sensor parameters to achieve better accuracy. The calibration of the equipment is accomplished only once, at the beginning.

For example, Tsai's work, supra, describes camera calibration techniques for computing both intrinsic and extrinsic parameters. Intrinsic parameters are those that are particular to a specific camera and lens, while extrinsic parameters relate the camera to other world coordinate systems. The process is divided into two stages for computation of six extrinsic parameters (camera yaw, pitch, roll, and three translation parameters), followed by computation of six intrinsic parameters (focal length, two lens distortion parameters, camera scanning and acquisition scale factor, and image center). While this and many similar methods can compute the parameters quickly, they depend on detailed real world knowledge, accurately known correspondences, and object recognition capabilities. This renders them impractical for mobile platforms where vibrations, sensor drift, noise and environmental variability have a significant impact.

More recently, coarse calibration techniques have been used with mobile robot platforms interacting in complex environments. Brooks et al., supra, describe a method by which forward motion vision is used to calibrate stereo vision, a type of bootstrapping calibration. Their calibration occurs in a velocity-dependent coordinate system that is more natural for obstacle avoidance maneuvers. Similar methods, which require minimal or coarse calibration, have been developed for many active vision algorithms, especially those that do not require accurate quantitative information, termed "inexact vision". There are many advantages to these inexact approaches to calibration for visual navigation, including continuous calibration updates, simplicity, quick computation, adaptation to changing sensor and world conditions, and specialization for a particular robot's tasks.

The time-to-contact is defined as the time required for an object to travel from its current position to the surface directly in front of the object, in the direction of motion of the object. The calculation of time-to-contact relies directly on the computed location of a focus of expansion (FOE) in a sequence of images of the environment. The FOE in an image is equivalent to the projection into the image plane of the three dimensional vector in the direction of motion of the object. Traditional methods exist for the computation of the FOE and are typically derived from the two-dimensional optical flow, although other direct methods exist. Optical flow is the apparent or perceived variation or motion of the image brightness patterns, in the image plane, arising from relative motion of objects and an observing system. By computing spacial and temporal derivatives of the changing image brightness pattern it is possible to obtain estimates of the optical flows.

In theory, in the conventional calibration methods, after a method has been used to compute the FOE, the sensor can then be pointed in the direction of motion of the vehicle in one step. However, these methods rely on accurate local information within each optical flow computed in order to locate the FOE, and do not set forth a robust strategy. Moreover, when the FOE of an image sequence is outside of the field of view of the sensor, computation of the FOE and thus time-to-contact is extremely error prone and inaccurate. No previously known algorithms can cope with this problem since it requires actively repositioning the sensor to locate the FOE within the field of view of the sensor more accurately. Further, when the FOE is located within the field of view of the sensor, but not centered in the image plane, computation of the time-to-contact may also be inaccurate, since there is little data available at the edges of the visible portion of the image. By actively centering the FOE in the image sequence, better accuracy is possible.

OBJECTS AND SUMMARY OF THE INVENTION

It is therefore an object of the present invention to provide an apparatus and method for accurate self-calibration of a visual time-to-contact sensor of a forward moving vehicle, with an obstacle in its immediate path, in order to enable a warning signal and alert the vehicle operator to pursue evasive action to avoid collision.

Another objective of the invention is to determine the location of the focus of expansion FOE accurately, without explicit calculation of the FOE.

Another objective of the invention is active and continuous repositioning of the sensor to locate the focus of expansion FOE within the field of view of the sensor, with sufficient accuracy.

It is still a further object of the invention to provide a method and a vision system for a mobile vehicle which operates in a high speed manner and which permits the continuous, adaptive motion of the vehicle through the vehicle's environment and provide a means and method which achieves good real-time processing and functioning.

Another object of the present invention is to provide a means and method which is operable without the initial calibration of pre-known relationships between the camera and the vehicle, and between the camera and the objects, located in the vehicle environment.

Yet another object of the present invention is to provide a means and method which is relatively insensitive to imprecision regarding the mathematical models used and the reliability of data utilized.

It is still another object of the invention to provide a vision system for a mobile vehicle, the system requiring a minimum of image processing complexity while having an image resolution which is sufficient for guiding the vehicle through an environment.

It is another object of the invention to provide a vision system for a mobile vehicle which provides a complete and unambiguous detection of obstacles and landmarks relevant to navigation which lie in the path of the vehicle while having a minimal complexity, cost and power consumption as compared to conventional vision systems.

Yet another objective of the invention is the use of continuous calibration and active sensor control in response to the environment, regardless of which direction the vehicle is pointing to, making the system effective when the vehicle is sliding, turning, backing up, etc.

Still another objective of the invention is to provide a method and apparatus wherein the time-to-contact is obtained through the use of visual data without the need for any sophisticated emitter and detector technology, such as radar.

Yet another objective of the invention is to use high speed digital and analog VLSI implementation that is low cost, low power, compact and light weight.

The aforedescribed problems are overcome and the objects of the invention are realized by a self-calibrating vision system for a vehicle, such as a mobile robot. In accordance with a method and apparatus of the invention, the apparatus includes at least one visual time-to-contact (TTC) sensor with an electronic camera having a two-dimensional field of view which encompasses the immediate forward path of the mobile vehicle. The vehicle is using forward motion vision to automatically and continuously self-calibrate without using any external measurement. It is noise tolerant while remaining simple computationally. The algorithms and the calibration procedure are easy to implement at real-time speed using a massively parallel computer for pipeline-based implementation.

The image sensor processor includes an image memory, coupled to an image processing unit which is operable for accessing the image memory, wherein the field of view of the camera is represented as binary data in the image memory. The image processing unit processes a plurality of images, output from the camera and stored in the image memory, evaluates the data in a visual control system and sends them to a pan and tilt interface and, potentially, to a navigation control system which controls the movement of the autonomously mobile vehicle or to the other systems for warnings. Iteratively, a weighted global average of the horizontal and vertical components of the optical flow is computed in the image processing unit, and pan and tilt of the visual TTC sensor is iteratively changed by the pan and tilt interface, in response to the visual control system, in the opposite direction by small increments, biased by the global magnitude of the optical flow. In this way, the visual TTC sensor is not constrained to point in any direction at the start, and after several iterations it will point near the FOE and continue to do so as the vehicle moves.

Yet another embodiment of the present invention is a method for active centering of the visual TTC sensor at the focus of expansion using optical flow to iteratively improve the approximate FOE position to within several degrees of actual FOE and for continuous calibration of the visual TTC sensor for obstacle avoidance by computing a coarse estimate of time-to-contact along the direction of vehicle motion.

The novel features of construction and operation of the invention will be more clearly apparent during the course of the following description, reference being had to the accompanying drawings, wherein there has been illustrated a preferred form of the device of the invention and wherein like characters of reference designate like parts throughout the drawings.

Figure 4:
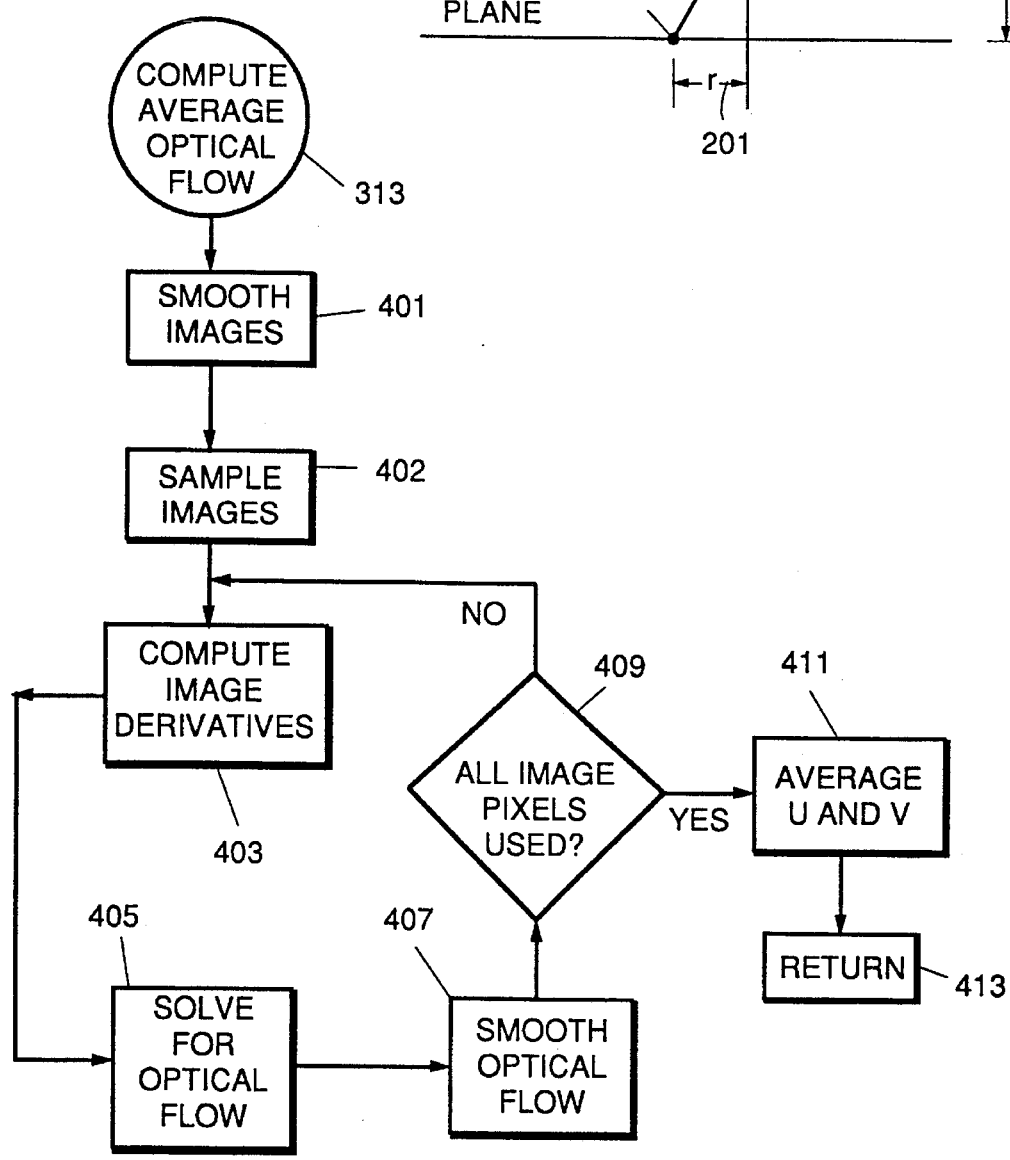
Figure 3:
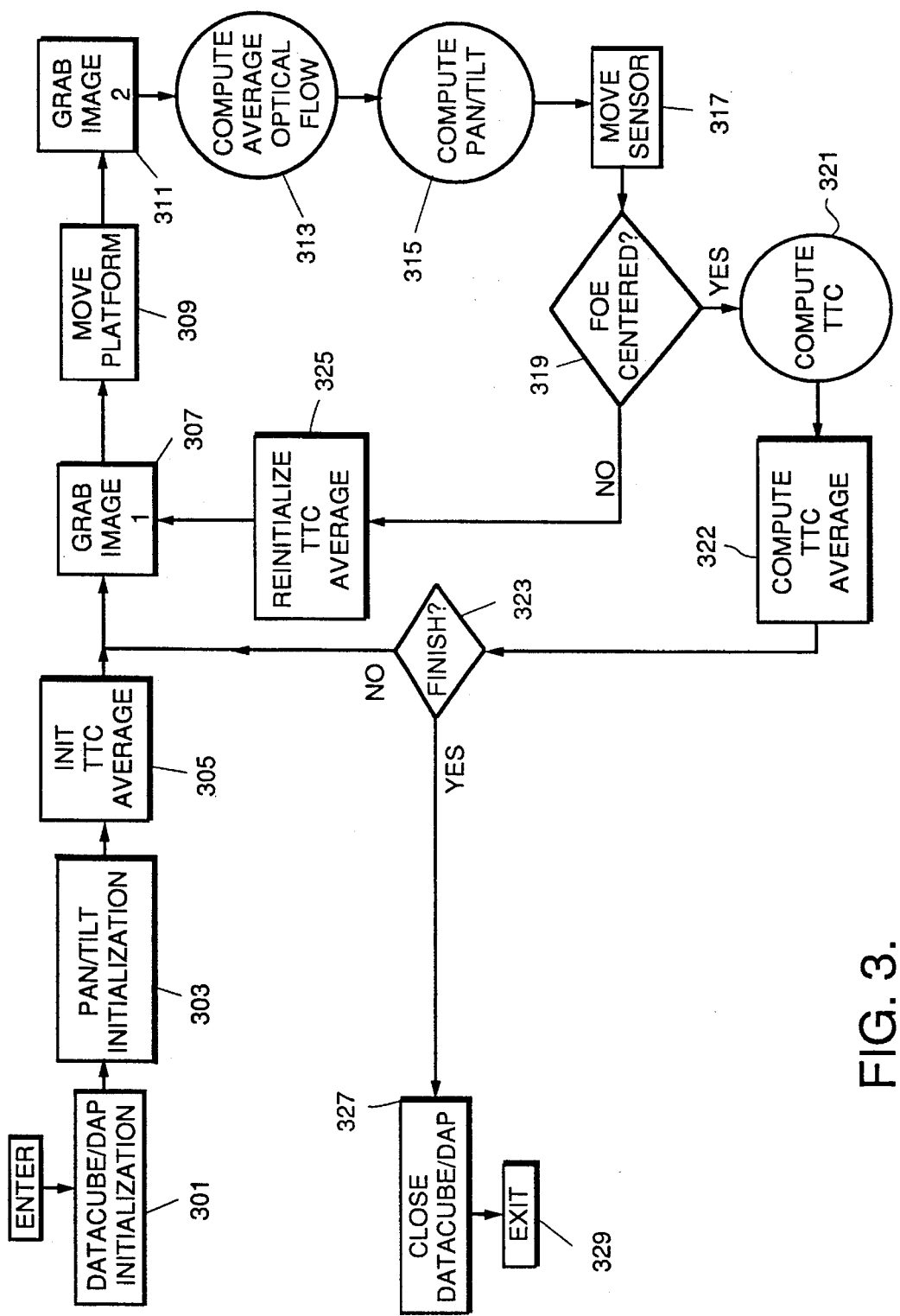
FIG. 3 is a flow chart of the main control procedure, programmed for the preferred embodiment and illustrating the operation of the vision system of FIG. 1, to be utilized in accordance with the present invention.

Each of FIG. 4, FIG. 5 and FIG. 6, are flow charts showing the flow of one subroutine module of the main control procedure shown in FIG. 3, in accordance with the present invention.

Figure 7:
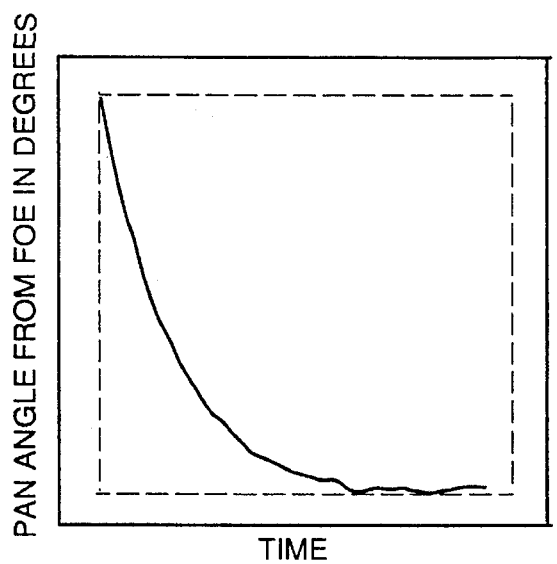

FIG. 7 is a pan angle versus time diagram showing result of an experiment, in accordance with the present invention.

Figure 8:
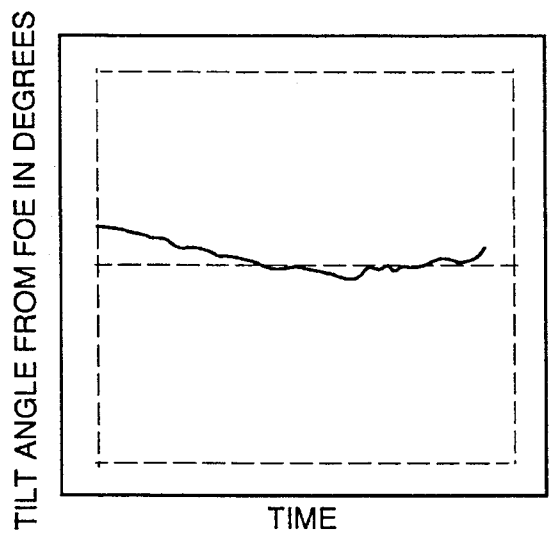

FIG. 8 is a tilt angle versus time diagram showing result of an experiment, in accordance with the present invention.

Figure 9:
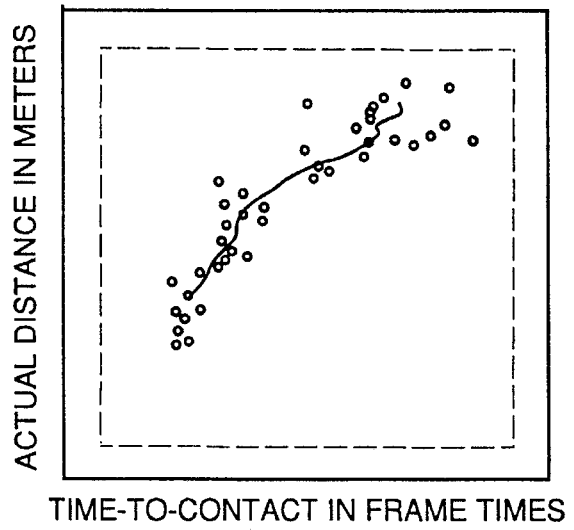

FIG. 9 is a time-to-contact versus actual distance diagram showing result of an experiment, in accordance with the present invention.

Figure 10:
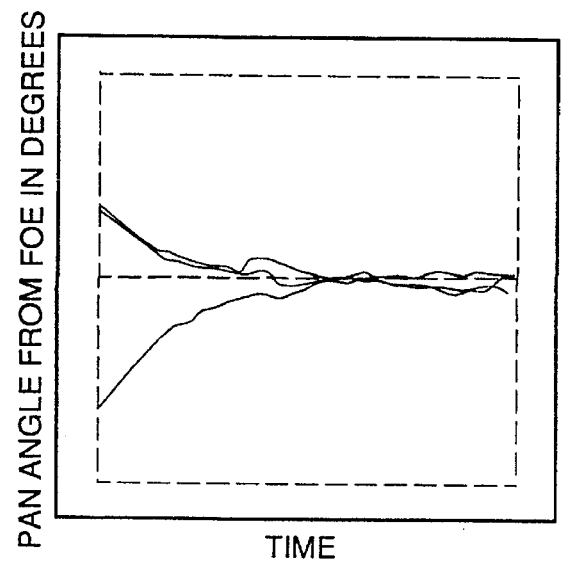

FIG. 10 is a pan angle versus time diagram showing result of an experiment with three sensors, in accordance with the present invention.

Figure 11:
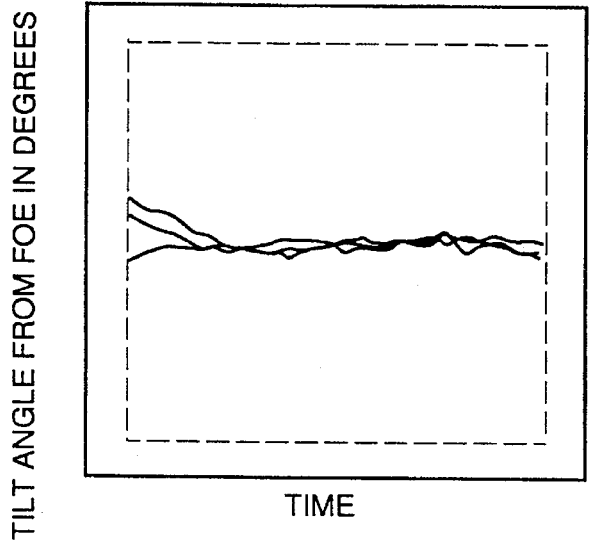

FIG. 11 is a tilt angle versus time diagram showing result of an experiment with three sensors, in accordance with the present invention.

Figure 12:
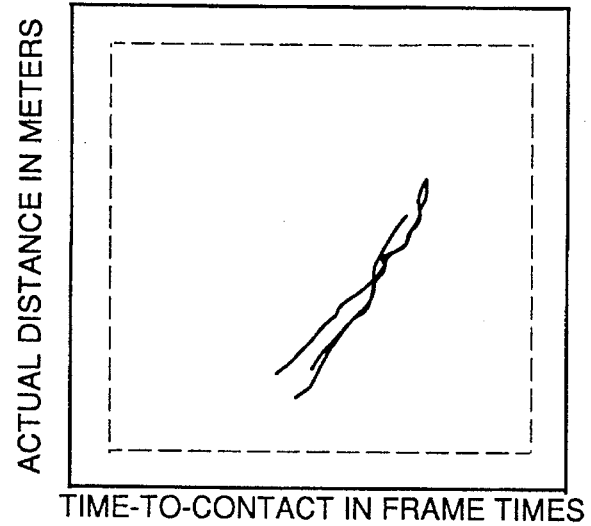

FIG. 12 is a time-to-contact versus actual distance diagram showing result of an experiment with three sensors, in accordance with the present invention.

DESCRIPTION OF THE PREFERRED EMBODIMENT

The following detailed description is of the best presently contemplated mode of carrying out the present invention. This description is not intended in a limiting sense, but is made solely for the purpose of illustrating the general principles of the invention.

The present invention relates to a self-calibrating vision system for manned or autonomous vehicle navigation with obstacle avoidance capabilities, required for potential applications in autonomous unmanned vehicle navigation in industrial robotics, unmanned systems including ground and air vehicles, etc. It also relates to use as a warning system for manned vehicles including passenger cars.

Figure 1:
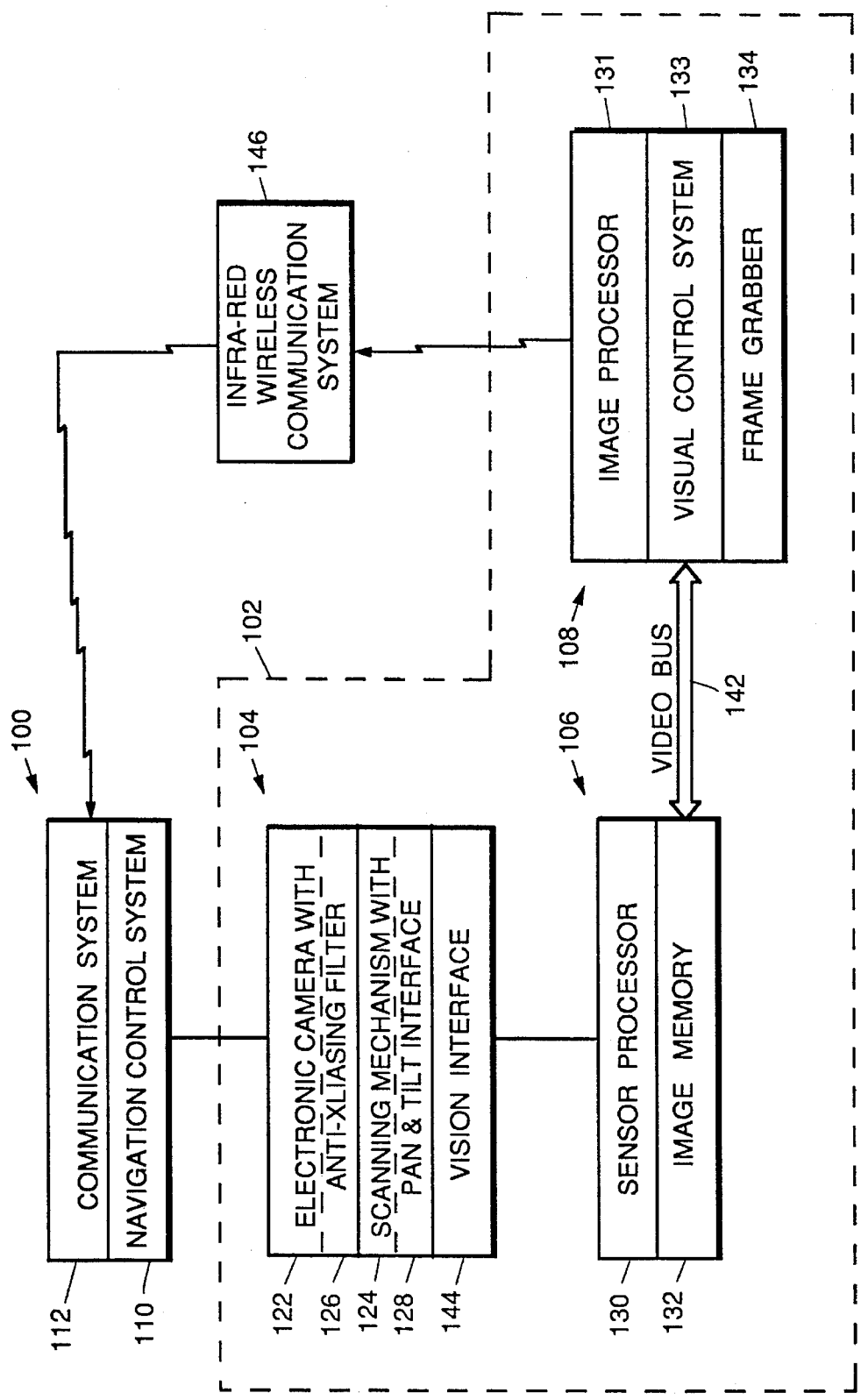
FIG. 1 is an illustrative block diagram showing a self-calibrating vision system utilized with a mobile vehicle, constructed and operated in accordance with the invention.

Referring now to the drawings in detail, wherein like numerals indicate like elements, there is shown in FIG. 1 a preferred apparatus, a self-calibration visual sensor system for a moving vehicle, such as a mobile robot, constructed in accord with the present invention. Moreover, FIGS. 3–6 illustrate how the control procedure steps of the self-calibration method are sequenced and operatively associated with one another in a computer program, in accordance to the preferred embodiment.

Referring to FIG. 1, there is shown one embodiment of a self-calibrating visual sensor system 102 with an autonomous mobile vehicle 100, although the invention could also be used with a manned vehicle, not shown. In accordance with the invention, this optical configuration both detects the position of objects, not shown, lying within or closely adjacent to the forward path of the robot. The self-calibrating visual sensor system 102 comprises four major subsystems:

(1) a visual TTC sensor 104 equipped with at least one electronic camera 122, a scanning mechanism 124, a pan and tilt interface 128 and a vision interface 144;

(2) an image sensor processor 106, including a sensor processor 130 and an image memory 132;

(3) an image processing unit 108 with a visual control system 133, an image processor 131 and an image grabber 134, operable for accessing the image memory 132;

(4) a video bus 142 between the image processing unit 108 and the image sensor processor 106.

A navigation control system 110 of the autonomous mobile vehicle 100, not a part of the present invention, inputs data from the image processing unit 108 via vehicle communication system 112 and infers therefrom data relating to the configuration of the environment which lies in front of the autonomous mobile vehicle 100. The navigation control system 110 generates control signals which drive propulsion and steering motors, not shown, in order to navigate the autonomous mobile vehicle 100 through the perceived environment.

The self-calibrating visual sensor system 102 of the preferred embodiment of the present invention allows the autonomous mobile vehicle 100 to autonomously use computer vision to move with respect to the object position without any prior knowledge or calibration between the one or more electronic cameras 122 with the computer vision and vehicle base, not shown, the electronic camera 122 and the object, or the vehicle base and the object position. The visual TTC sensor 104 comprises at least one electronic imaging device, such as an electronic camera 122, mounted to the vehicle base. The electronic camera 122 is equipped with a lens, not shown, and an appropriate noise reducing filter 126. The scanning mechanism 124 moves the electronic camera 122 in pan and tilt direction, via a pan and tilt interface 128, so as to scan an area, encompassing the immediate forward path of the autonomous mobile vehicle 100 and also the laterally disposed areas, in order to permit turning adjustments. The electronic camera 122 is calibrated by adjusting pan and tilt angles of the scanning mechanism 124.

The vision system electronic camera 122 is equipped with a light sensitive array, such as a CCD array, to capture images of the environment. The electronic camera 122 of the preferred embodiment includes a CCD imaging device with CCD sensors, not shown, with a square or rectangular field of view (FOV), directed so that it encompasses the forward path of the autonomous mobile vehicle 100 in the immediate maneuvering vicinity. It is preferred because of its low cost and power consumption, and its sensitivity to near-infrared radiation. The electronic camera 122 generates a plurality of pixels, stored in the image memory 132, which have a value indicative of an intensity of radiation incident upon them. In the presently preferred embodiment of the invention, each image is comprised of 512×480 pixels, resulting in approximately 250,000 pixels per image. The image brightness intensity, spectral characteristics and pulse repetition rate of the scanning mechanism 124 are predetermined to maximize signal to noise ratio in a visual TTC sensor 104 over a variety of ambient lighting conditions, while consuming minimal energy.

The autonomous mobile vehicle 100 further comprises the image sensor processor 106 which is coupled to the output of the electronic camera 122. In accordance with the invention, the image sensor processor 106 comprises the image memory 132 which stores at least two image frames output by the electronic camera 122 and the sensor processor 130.

The image processing unit 108 is coupled to the image memory 132, via video bus 142, and is operable for reading the stored image frame data therefrom. The image processing unit 108 further comprises the image processor 131, the visual control system 133 and it own memory, not shown, used for storing software programs. These programs are operable for performing calculations upon the stored image frame data, this computation being described in detail hereinafter. In addition, the image processing unit 108, identifying the position of the objects, not shown, in the electronic camera 122 space, compares those positions and instructs movements of the vehicle base, not shown, to achieve movement of the vehicle with respect to the object position, not shown, or to avoid the objects detected in the electronic camera 122 space. Once the movement of the autonomous mobile vehicle 100 has begun, the system tracks this movement and adjusts its estimations and instructions in the visual control system 133, according to further monitoring by the electronic camera 122. By utilizing the different angles of the electronic camera 122, the continuous monitoring of the object positions leads to successful movement of the autonomous mobile vehicle 100 in actual physical space.

The image processing unit 108 is a major component of the vision system. It acquires digitized video information from the image memory 132, processes that information to measure or inspect objects and its distance, communicates with the scanning mechanism 124 and the navigation control system 110, and can display images and information for human viewing. Extracting visual information requires many computational operations in a short time, so the image processing unit 108 and image sensor processor 106 often use parallel processing to get the required speed.

The form of parallel processing used by the image processing unit 108 is called pipelining. In a pipelined processor, one or more streams of data flow through a sequence of processor's computational modules, each of which transforms the data or extracts information. Pipelined processing is especially appropriate for processing images, because the addressing of the arrays, such as visual images, is inherent in the pipeline sequence and fetch and store operations are not needed for each pixel in the pipelined processor's execution cycle. The pipelined processors read digital values of image pixels from an acquisition module or an image memory, process the pixel stream and return the processed values or extracted information to the image memory.

The pipeline style architecture is appropriate for most real-time image processing applications. Its processing modules can be grouped into three basic categories:

1. Image enhancement modules, which encompass contrast enhancement and noise reduction modules, take the original (fuzzy) image and enhance it in ways that facilitate further processing;

2. Feature extraction modules, which execute a multiple step algorithm on the video data stream, eventually produce the desired symbolic or numerical information on closeness and identity of the target, anticipated trajectory, etc.;

3. Control modules, which accept the symbolic or numerical information, use it to exert control over some device.

The image enhancement modules do simple "pixel-based" operations on the video data stream to produce a new video data stream. While these pixel-based operation are simple, the volume of video data on which these operation might be performed is massive. Image enhancement hardware includes fast image enhancement boards like those manufactured by Datacube. Parallel processing, done in a pipeline stage, requires an unusually high amount of processing power to sort the video data stream and then to route the video data to other processor for features extraction. The Datacubes MAXvideo 20 and MAXvideo 200 are well suited for doing front-end pixel-based operations in a pipelined real-time video system. These VMEbus boards are equipped with video acquisition modules and multiple high speed ALUs, allowing them to perform a variety of pixel-based image enhancement operation such as filtering, edge detection, contrast enhancement, frame rotation, and transformation, etc.

Feature extraction modules execute numerous multiple step algorithms on the video data stream that eventually produces the desired symbolic or numerical information. For fast execution of software-based feature extraction algorithms, the preferred hardware are RISC processors and digital signal processors (DSP).

DSP-based processor boards have multiple floating-point digital signal processors, each capable of performing at least 40 million floating-point operations per second. The multiple DSP chips on many of these boards are interconnected by fast point-to-point parallel communication channels, each fed by a dedicated DMA controller inside the DSP chips. They allow quick and efficient movement of pipelined data from chip to chip without slowing down the on-chip digital signal processors which are executing the image processing algorithm.

The image processing unit 108 of the preferred invention supports the purpose of the present invention to provide an accurate estimate of the time-to-contact of the forward moving autonomous mobile vehicle 100, with at least one visual TTC sensor 104 with the electronic camera 122 mounted on it, with an obstacle in its immediate path, in order to enable a warning signal and alert the vehicle operator to pursue evasive action to avoid collision. The images obtained from the moving electronic camera 122 are digitalized and analyzed in the image processing unit 108. The present invention presents a simpler approach to sensor calibration since no explicit calculation of the FOE is required or desired, because determining the location of the FOE accurately is a difficult and error prone process. By avoiding the computation of the FOE and eliminating an explicit use of it, the time-to-contact calculation becomes self-calibrating and the apparatus is faster and more robust to vibrations and sensor misalignment.

The active control of the visual TTC sensor 104 by adjustment of pan and tilt angles, as the autonomous mobile vehicle 100 moves, is accomplished in the visual control system 133 of the image processing unit 108. In the preferred embodiment of the present invention, the visual control system 133 is adjusting the pan and tilt angles by computing an average optical flow by calculating a weighted global average of both the horizontal and vertical components of the optical flow, as described in detail hereinafter, and iteratively panning and tilting the visual TTC sensor 104, by the scanning mechanism 124, via pan and tilt interface 128, in the opposite direction by small increments, biased by the global magnitude of the optical flow. In this way, the visual TTC sensor 104 is not constrained to point in any direction at the start, and after several iterations it will point near the FOE and continue to do so as the autonomous mobile vehicle 100 moves. To avoid possible complications in the computation of the optical flow, the visual TTC sensor 104 is not panned or tilted between successive image used to compute the average optical flow.

An output of the image processing unit 108 which is expressive of position information relating to objects within the field of view of the electronic camera 122 is supplied, via an RS-232 or parallel data link, to the navigation control system 110, which employs the navigation data, based upon the perceived image of the environment, to steer the autonomous mobile vehicle 100 down a straight path, or to alter the path of the autonomous mobile vehicle 100 in order to avoid an obstacle within its path.

The use of continuous calibration and active sensor control in response to the environment enables the visual TTC sensor 104 to align itself and to track the direction of motion of the autonomous mobile vehicle 100 regardless of which direction the autonomous mobile vehicle 100 is pointing to, making the system effective when the autonomous mobile vehicle 100 is sliding, turning, backing up, etc. Moreover, the self-calibrating visual sensor system 102, presented in the preferred embodiment of the present invention, does not restrict initial position and orientation of the electronic camera 122 to any known values. Thus, the electronic camera 122 may initially point to any direction and the apparatus assumes that the direction is unknown. Furthermore, the autonomous mobile vehicle 100 need not move in a linear path since between any two images, close in time, the motion is approximately linear.

The time-to-contact is obtained through the use of visual data without the need for any sophisticated emitter and detector technology, such as radar, etc. The use of visual data to obtain time-to-contact enables high speed digital and analog VLSI implementation that is low cost, low power, light weight and small. Moreover, the separation of the optical flow calculation into two one-dimensional computations enables lower cost hardware implementations.

In the implementation of the preferred embodiment, the image sensor processor 106 used is a Datacube and the image processing unit 108 used is a Cambridge PP DAP SIMD parallel processor (DAP). The Datacube is a special purpose pipelined image acquisition and processing computer, manufactured by Datacube. The DAP is a massively parallel single instruction, multiple data computer (SIMD) with the frame grabber 134. All the hardware elements of this system, are available as commercial products. However, a Motorola 68000-based processing system, available from SUN Microsystems, Inc., Sunnyvale, Calif., can also be used for main control process. Image memory 132 may be contained within the frame grabber 134 pc-board, such as a type manufactured by Coreco or Imaging Technologies. Both of these arrangements can communicate with each other over the video bus 142, like Multibus™ bus. It should be realized that the invention may be practiced by a number of different computational means and should not be construed to be limited to only that disclosed herein.

The electronic camera 122 to be used in the present invention may be a model TM440 CCD camera manufactured by Pulnix, a Panasonic CCD camera model BD 404 or any other CCD camera. The camera may have a relatively short focal length of, for example, 8 mm in order to maximize the field of view. It should be realized that the invention may be practiced with a variety of types of image sensors or cameras other than those disclosed above. Furthermore, the exact nature of the image processing algorithm may be modified by those having ordinary skill in the art, while still achieving a substantially identical result.

The present invention also embodies a method for self-calibration of a visual TTC sensor 104. With reference to FIGS. 3–6, several flowcharts are shown which describe the computation steps of the software programs developed which may be used for the method of the preferred embodiment, according to the present invention.

In conventional methods, the computation of the average optical flow uses an algorithm developed by Uras, S., Girosi, F., Verri, A., & Torre, V: "The Computation of the Optical Flow", Dipartimento di Fisica dell' Universita di Genova, Italia, (1988), which imposes the constraint of the stationarity of the image gradient. This allows for a closed form solution to the optical flow at each pixel in the image. Other methods for computing the optical flow exist and may also be substituted for the current technique.

In the algorithm suggested by Uras et. al., supra, vector $I(x,y,t)$ represents image brightness pattern at time t and location $(x,y)$ in the image plane. Vector $v(U(x,y,t), V(x,y,t))$ is the optical flow, at the location $(x,y)$ at time t, in a system of coordinates fixed in the image plane. The image brightness changes over time very slowly. Therefore, we may assume that the brightness of a small area of the image remains essentially constant so that the total temporal derivative of the image brightness pattern, i.e., the temporal derivative along the trajectory on the image plane, is approximately equal to zero.

$$dI/dt=0 \tag{1}$$

This equation, usually called image changing brightness equation, can be rewritten as:

$$\nabla I \cdot v + \alpha I/\alpha t = 0 \tag{2}$$

where $\nabla$ is the spatial gradient over the image plane.

In order to compute the closed form solution, the second partial derivatives of the image brightness intensity with respect to the spatial coordinates $(x,y)$, and temporal coordinate t $(I_{xx}, I_{yy}, I_{xy}, I_{xt}, I_{yt})$, where x and y are the horizontal and vertical directions in the image plane at each pixel, need to be calculated. The subscripts represent differentiation with respect to the spatial coordinates $(x,y)$ and the temporal (t) coordinate.

Since computing second derivatives from images is a noise amplifying process, the original input images are smoothed with a Gaussian smoothing by filtering to avoid aliasing in both spatial and temporal dimensions. Experiments conducted with real image data have demonstrated the need for filtering of input images before sampling, since the derivatives are sensitive to aliasing effects resulting from inadequate low-pass filtering before sampling. In addition, sometimes, it is appropriate to perform subsampling of the optical flow in which unreliable vectors are eliminated, in order to preserve the direction and amplitude of the optical flow. The second technique is called a smoothing of the optical flow, obtained with the convolution of both of its components U and V with a Gaussian filter, as described hereinafter.

Gaussian smoothing, whereby the image is convolved with a Gaussian function, is perhaps one of the most commonly used smoothing techniques in advanced computer vision since it possesses several useful properties. However, since the size of the masks is very large, the processing is computationally intensive. Since there is hardware available for dedicated image processing for Gaussian filtering, this type of smoothing was considered and implemented in the preferred embodiment of the present invention. In addition, the Gaussian smoothing was utilized in the preferred embodiment of the present invention because it allows a choice of the resolution at which the image brightness intensity changes are manifested in the image, to correlate to the level of detail which is to be retained in the image. Fortunately, there is no need to use two-dimensional Gaussian functions since the convolution of a two-dimensional Gaussian function can be effected by two convolutions with one-dimensional Gaussian functions. Thus, the image is first convolved with a vertical Gaussian function and the result is convolved with a horizontal Gaussian function.

Smoothing technique, utilized in the preferred embodiment of the invention, applies smoothing subject to a certain condition. The center pixel is only assigned a new value if the difference between the average value and the original pixel value is greater than a previously set threshold. In this way, the noise is removed without smoothing out too much of the detail in the original image.

After the computation of the second partial derivatives of the image brightness intensity, with respect to the spatial coordinates (x,y) and temporal coordinate t, the optical flow solution for each pixel can then be calculated from the following equations:

$$Det=(I_{xx} \times I_{yy})-(I_{xy}^2) \tag{3}$$

$$U=((I_{yt} \times I_{xy})-(I_{xt} \times I_{yy}))/Det \tag{4}$$

$$V=((I_{xy} \times I_{xy})-(I_{yt} \times I_{xx}))/Det \tag{5}$$

where U and V are the horizontal and vertical components of the optical flow and Det is a determinant of the system.

The above equations (3)–(5) are solved for each individual pixel of the image. The output of the optical flow computation is further used to obtain the weighted global average of horizontal and vertical component of the optical flow at each pixel in the image. The differentiation amplifies the noise and the partial derivatives of brightness are often unreliable. However, the determinant Det may be used as a measure of the goodness of the optical flow calculation at a given pixel. Low determinant values correspond to locations where little or no useful data was available. Thus, in the next stage a Gaussian function is used to smooth the optical flow of each pixel at high values of the determinant, replacing locations where no useful optical flow data was computed with the weighted average of the neighboring good data, and a global average of the U and V components of the optical flow is computed. In the rare case where low contrast regions of an image exist, no useful optical flow can be computed. In these cases, a heuristic, not shown, is used to compute the global average by dividing the image into a small number of blocks. The avenge over each block is computed, and if the block and a corresponding block on the opposite of the image center do not contain enough optical flow data, both blocks are ignored and do not contribute to the global average. This ensures that the global optical flow average is not biased by scene content.

Next, the pan and tilt angles are computed in order to center the FOE in the image plane and continue to keep it centered. The computation of pan and tilt takes as input the weighted global average of the U and V components of the optical flow. The optical flow bias is then computed, combined with average optical flow and the result is used to compute pan and tilt angles from the U and V global averages, for the new sensor orientation. Since U corresponds to the average horizontal component of the velocity of the brightness pattern in the image plane, it effects the pan angle. V corresponds to the average vertical component of the velocity of the brightness pattern in the image plane and it effects the tilt angle. When U component is larger, a correspondingly larger panning motion in the opposite direction must be used to move the camera toward the FOE. When V component is larger, a correspondingly larger tilt motion in the opposite direction must be used to move the camera toward the FOE.

After the pan and tilt angles have been computed in the image processing unit 108, the pan and tilt of the visual TTC sensor 104 is iteratively moved toward the FOE, by the scanning mechanism 124, by small increments, biased by the global magnitude of the optical flow. In this way, the visual TTC sensor 104 is not constrained to point in any direction at the start, and after several iterations it will point near the FOE and continue to do so as the autonomous mobile vehicle 100 moves.

In practice, two methods of computing the pan and tilt from the optical flow averages have been attempted. In the first method, a simple linear relation between the optical flow and pan and tilt was incorporated and the optical flow bias used merely scales the value of the pan and tilt angles. In the second method, a more complex, exponential, relation between the optical flow and pan and tilt angles was used and larger optical flow averages result in exponentially larger angular motions.

Figure 2:
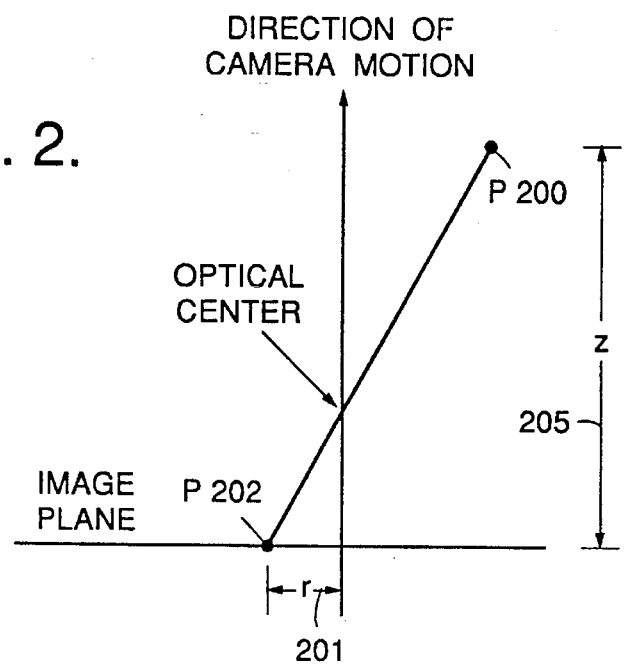
FIG. 2 is a diagram showing geometry for time-to-contact calculation, in accordance with the present invention.

Computation of the time-to-contact of the image plane with the closest surface directly in front of the autonomous mobile vehicle 100 is useful for obstacle avoidance. Time-to-contact may be computed from the optical flow using the following relation, described by Brooks, supra, which holds for surfaces of approximately constant depth and for motion along the direction of the sensor axis, $$r/R=Z/V \tag{6}$$

where the parameters r, Z and V, and a relationship between them are shown in FIG. 2. The 3D point P is identified by 200; a distance r from the FOE to the image of a 3D point p 202 is indicated by 201; R, indicated by 203 and not shown, is the magnitude of the optical flow at the image of a 3D point p 202 (i.e. dr/dt, Z, identified by 205, is the distance from the image plane to the 3D point P 200, and V 207, not shown, is the velocity of the visual TTC sensor 104, as shown in FIG. 2. Since time-to-contact (Z/V) is very sensitive to the location of the FOE, only a coarse estimate of the time-to-contact without explicitly knowing the FOE position is available after one frame time. By averaging over time, within several frame times, as the autonomous mobile vehicle 100 moves toward an object, an accurate value for the time-to-contact can be computed and tracked.

The computation of the TTC value for each pixel is accomplished by calculating the distance r 201 from the FOE to the image of the 3D point p 202 in the image plane, divided by the magnitude of the optical flow R 203 at that distance. The result is a value for the time required for that point in the image to reach the sensor plane, as the visual TTC sensor 104 moves toward the surface. The pixel distance r 201 and the magnitude of the optical flow R 203 are computed on a coarse scale and then averaged over the whole image, in order to avoid the effects of noise and error in measurement.

The method presented in the present invention is usable even when the FOE of an image sequence is outside of the field of view of the visual TTC sensor 104, because the mathematical computation of the FOE is not used in this method. Further, when the FOE is located within the field of view of the visual TTC sensor 104, but not centered in the image plane, the time-to-contact is computed with better accuracy than in the conventional methods since in the present invention we are actively centering and continuously repositioning the visual TTC sensor 104 to locate the FOE within the field of view of the visual TTC sensor 104.

Software Implementation

Implementation of the self-calibrating method, described above and used in the preferred embodiment of the invention, is accomplished by software programs, not shown, written in the C-language and executing on the Datacube and the DAP processors. The flow charts of FIGS. 3–6 represent the steps which may be used for programming the processors of the present invention to self-calibrate the visual TTC sensor 104.

Description of Main Process for Time-To-Contact TTC Calculation Diagram

As shown in FIG. 3, the main process begins with the preliminary step of initialization of the Datacube and DAP computers, in step 301. The pan and tilt interface 128 for the visual TTC sensor 104 is initialized in step 303 and TTC value and Optical Flow Average variables are initialized in step 305. A loop, in which the final output time-to-contact is computed, begins. The Datacube grabs an image at time t1, in step 307. The autonomous mobile vehicle's 100 base is moved forward, in step 309, with approximately linear motion. The second image is obtained from the Datacube at time t2, in step 311. The average optical flow between time t1 and t2 is computed using the DAP computer, in step 313. The average optical flow is used to compute the proper pan and tilt, in step 315, to point the visual TTC sensor 104 closer to the focus of expansion (FOE) and to keep the brightness constant. Once the pan and tilt angels have been computed, the visual TTC sensor 104 is moved with the proper pan and tilt toward the FOE, in step 317.

When the FOE is centered in the image, a necessary requirement to compute TTC value, as tested in step 319, the TTC value is computed for the image pair for time t1 and t2, in step 321. If the FOE is not yet centered, no TTC value is computed. The determination of whether the FOE is centered or not is made by examining the weighted global average of the optical flow in two dimensions (U and V), calculated as shown in Equations (3)–(5), and in the flow diagram in FIG. 4, described below. If the weighted global averages of the optical flow (U and V) are below a threshold, which can be biased by current state and noise criterion, the FOE is assumed to be approximately centered. If the FOE is not centered in the image, the TTC average is re-initialized in step 325 and the process is returned to step 307 to grab another image, at time 13, and to continue with the aforementioned processing.

Once the FOE is centered, TTC value is computed is step 321, and a calculation of the average of the most recent TTC values is staffed in step 322. The algorithm can continue to compute TTC values since, as the sensor platform moves, the self-calibrating nature of the system will prevent false TTC values, arising from poor FOE centering, from influencing the output averages. The output TTC average is a better estimate of the actual TTC value since any one TTC value may be biased by noise or poor centering of the FOE. After a single TTC value for a given image pair has been computed, the loop continues with a new image pair and computation of a second TTC value, and so on. When the system is halted, in step 323, the Datacube and DAP computers are closed and released in step 327 and the process exits in step 329.

Description of Computation of Average Optical Flow Diagram

In order to compute the closed form solution, the second partial derivatives of the image brightness intensity with respect to x,y, and time ($I_{xx}$, $I_{yy}$, $I_{xy}$, $I_{xt}$, $I_{yt}$), where x and y are the horizontal and vertical directions in the image plane at each pixel, need to be calculated in step 403, shown in FIG. 4. However, before the computation, since computing second derivatives from images is a noise amplifying process, the original input images are smoothed with a Gaussian function, in step 401.

Using the Equations (3)–(5), shown above, the computations of the weighted global average of horizontal and vertical component (U and V) of the optical flow at each pixel in the image are performed in step 405. The differentiation amplifies the noise and the partial derivatives of brightness are often unreliable. Thus, the next stage is used to smooth the optical flow components U and V of each pixel, in step 407, at high values of the determinant, replacing locations where no useful optical flow data was computed with the weighted average of the neighboring good data. A global avenge of the U and V components of the optical flow is computed, in step 411, and returned to the main process in step 413.

Description of Computation of Pan/Tilt Diagram

The computation of pan/tilt module, shown in FIG. 5, takes as input the weighted global average of the U and V components of the optical flow and produces the pan and tilt angles for the new visual TTC sensor 104 orientation. These pan and tilt angles are computed in order to center the FOE in the image plane and continue to keep it centered, even after TTC value calculation begins. The optical flow bias is computed in step 501 and combined with average optical flow in step 503. The result is used in step 505 to compute pan and tilt angles from the U and V global averages, returned to the main process in step 507. Since U corresponds to the average horizontal component of the velocity of the brightness pattern in the image plane, it effects the pan angle. V corresponds to the average vertical component of the velocity of the brightness pattern in the image plane and effects the tilt angle.

In practice, two methods of computing the pan and tilt angles from the optical flow averages have been attempted. In the first method, a simple linear relation between the optical flow and pan and tilt angles was incorporated and the optical flow bias used merely scaled the value of the pan and tilt angles. In the second method, a more complex, exponential relation between the optical flow and pan and tilt angles was used and larger optical flow averages resulted in exponentially larger angular motions. The method using exponential relation provides better results.

Description of Computation of Time-to-Contact (TTC) Diagram

The computation of the TTC value for each pixel is accomplished, in step 605 in FIG. 6, by calculating the distance from the FOE to the image of the 3D point p 202, shown in FIG. 2, in the image plane, in step 603, and dividing the result with the magnitude of the optical flow at that distance, calculated in step 601. The result is a value for the time required for the 3D point P 200 to reach the visual TTC sensor 104 plane as the sensor moves toward the surface. The pixel distance and optical flow magnitude are computed on a coarse scale and then averaged over the whole image, in step 609, in order to avoid the effects of noise and error in measurement, and the result is returned in step 611.

Experimental Results

The above described self-calibrating visual sensor and method have been tested using actual hardware as well as in a detailed simulation environment to verify the concept, in accordance with the present invention. The latest version of the self-calibrating visual time-to-contact sensor, described above, has been implemented using following actual hardware. The computers utilized in the implementation of the preferred embodiment were the Datacube and the AMT DAP SIMD parallel processor (DAP). The imaging device utilized in the experiments was a standard color Panasonic CCD camera, mounted on a manually controlled base. The base used incorporates sensing through the camera, pan and tilt actuation modules, and offboard computation.

In the experiments, the brightness patterns in two successive image frames were used to recover the optical flow, computed by means of the method described previously, with the following parameters: standard deviation of the Gaussian used as a spatial filter was approximately 20 pixels and 5 point derivatives were used to calculate the second partial derivatives.

The results of the experiments have indicated that the self-calibrating computation of the time-to-contact without explicit knowledge of the focus of expansion is accurate to within approximately 10% of the real value for a single pair of images from the visual TTC sensor 104. Accuracy improves as time-to-contact is averaged over multiple image pairs. The system is robust to the positioning error, since only relative sensor pan and tilt are used, and it can recover from catastrophic position errors.

In his article "Self-Calibration of a Multi-Camera Vision System", 24th Asilomar Conference on Signals, Systems and Computers, 1990, the Inventor had presented an initial version of the method of the preferred embodiment as one of the possible methods of self-calibration of a multi-camera vision system. The initial experiments were conducted in a simulated world and with real-time hardware simulation. A noisy and controlled image sequence was used to demonstrate the applicability and robustness of the method disclosed in the article. The effects were examined and it had been established that the method is robust and stable over time.

Experimental results of the simulation are shown in FIGS. 7–12. The experiment was conducted on a Symbolic LISP Machine. The language used was LISP.

In the first experiment, a single camera with an 8.0 mm focal length lens was initialized with random pan and tilt angles and then moved linearly toward a wall at constant velocity. FIGS. 7–8 show typical results for pointing the camera at the FOE. The horizontal axis represents time measured in the number of frames, while the vertical axis shows the pan angles, in FIG. 7, and tilt angles, in FIG. 8. In most cases, the method was able to point the sensor to within two degrees of the actual FOE, although this was dependent on the environment with sufficiently textured surfaces to be able to compute the optical flow. The method failures were most often due to untextured surface patches where optical flow is nearly zero, corrupting the global average of the optical flow. FIGS. 10–11 show results from the second experiment in which three cameras located at different position on the base platform were started at random pan and tilt angles. The base platform moved forward at a constant velocity, and after several frames, the cameras pointed within 1 degree of the actual FOE.

Computation of the time-to-contact was subject to numerous problems. A two degree error in FOE location results in a 10% error in pixel location, when a 16 mm focal length lens is used. This means that the best accuracy of time-to-contact that can be achieved is with at least 10% error. FIG. 9 shows time-to-contact results from the first experiment mentioned above and shown in FIGS. 7–8, with the horizontal axis displaying the time-to-contact in frame times and the vertical axis showing the actual distance to the wall directly in front of the visual TTC sensor 104. The method continued to point the visual TTC sensor 104 in the direction of motion, and after the single camera has reached a stable position pointing at the FOE, the time-to-contact was computed for each image pair. No explicit computation of the FOE was made. Actual time-to-contact values are shown in FIG. 9 as tiny squares. The line shows the running average of ten time-to-contact values and clearly indicates a decreasing linear trend as the base platform moves toward the wall. This is still suitable for obstacle avoidance since the method can use a worst-case value of the actual time-to-contact. FIG. 12 shows the running average of time-to-contact from the second experiment, shown in FIGS. 10–11, in which three cameras were aligned. The computed time-to-contact was accurate to within ten percent for all three cameras.

The invention described above is, of course, susceptible to many variations, modifications and changes, all of which are within the skill of the art. It should be understood that all such variations, modifications and changes are within the spirit and scope of the invention and of the appended claims. Similarly, it will be understood that Applicant intends to cover and claim all changes, modifications and variations of the example of the preferred embodiment of the invention herein disclosed for the purpose of illustration, which do not constitute departures from the spirit and scope of the present invention.

What is claimed is:

1. A self-calibrating visual sensor system, mounted on a mobile vehicle, comprising:
   a visual time-to-contact (TTC) sensor that determines a time before said sensor will contact an object in its path, said TTC sensor generating a plurality of image frames descriptive of a travel area in the direction of movement of the mobile vehicle;
   an image sensor processor, coupled to said visual TTC sensor, comprising an image memory for storing at least two image frames outputted by the visual TTC sensor;
   an image processing unit comprising an image grabber, coupled to the image memory and operable for reading the stored image frames from the image memory, and a visual control means for continuous calibration of the visual TTC sensor to point in the direction of focus of expansion (FOE) by adjusting pan and tilt angles of the visual TTC sensor; and
   a video bus between the image processing unit and the image sensor processor for transfer of image frames.

2. The self-calibrating visual sensor system of claim 1, wherein said visual TTC sensor comprises at least one electronic camera, with image digitization capability, generating a plurality of pixels stored in the image memory which have a value indicative of the intensity of brightness in the field of view of said electronic camera.

3. The electronic camera of claim 2, comprising a noise reduction filter to smooth high-frequency noise by generating a weighted sum of the adjacent pixel values.

4. The self-calibrating visual sensor system of claim 2, wherein each said electronic camera is used without pre-calibration of the area of movement and the field of view of the camera.

5. The self-calibrating visual sensor system of claim 2, wherein each said electronic camera is used without predetermining the position of the camera with respect to the mobile vehicle or the obstacles located in the mobile vehicle's environment.

6. The self-calibrating visual sensor system of claim 1, wherein said visual TTC sensor further comprises a scanning mechanism, a pan and tilt interface and a vision interface.

7. The self-calibrating visual sensor system of claim 1, wherein said visual control means for continuous calibration of the visual TTC sensor iteratively computes an average optical flow by calculating a weighted global average of the horizontal and vertical components of optical flow for successive image frames, the pan and tilt angles to point the visual TTC sensor closer to the focus of expansion (FOE), and TTC value, for adjusting the course of movement of the mobile vehicle until the desired position is achieved.

8. The self-calibrating visual sensor system of claim 7, wherein said visual control means for continuous calibration of the visual TTC sensor computes the pan and tilt angles by computing optical flow bias and combining it with the average optical flow.

9. The self-calibrating visual sensor system of claim 7, wherein said computation of the average optical flow within said visual control means further comprises smoothing the optical flow with a Gaussian function at each pixel, at high values of the determinant, by replacing values with the weighted average of the neighborhood data.

10. The self-calibrating visual sensor system of claim 1, wherein said calibration is accomplished without explicit calculation of the FOE.

11. A method of self-calibrating a visual time-to-contact (TTC) sensor that determines a time before said sensor will contact an object in its path, said TTC sensor mounted on a mobile vehicle, for obstacle detection or avoidance, comprising the following steps:
 (a) active centering of the visual TTC sensor at the focus of expansion FOE using optical flow by continuously calibrating the pan and tilt of the sensor to point in the direction of the FOE;
 (b) computing a coarse estimate of time-to-contact (TTC) value along the direction of the mobile vehicle's motion, in order to accurately predict the time-to-contact with stationary and moving obstacles in the mobile vehicle's immediate path, and enable warning or evasive action; and
 (c) continuously repeating the steps (a) to (b) for adjusting the course of movement of the mobile vehicle until the desired position is achieved.

12. A method of self-calibrating a visual time-to-contact (TTC) sensor that determines a time before said sensor will contact an object in its path, said TTC sensor mounted on a mobile vehicle, for continuous calibration of the visual TTC sensor to point in the direction of focus of expansion (FOE), without explicit calculation of the FOE, comprising the following steps:
 (a) grabbing an image at time t1;
 (b) moving the mobile vehicle forward with approximately linear motion;
 (c) grabbing second image at time t2;
 (d) computing an average optical flow by calculating a weighted global average of the horizontal and vertical components of the optical flow between time t1 and t2;
 (e) computing pan and tilt angles to point the visual TTC sensor closer to the focus of expansion (FOE);
 (f) moving the visual TTC sensor with the calculated pan and tilt angles toward the FOE;
 (g) computing the TTC value for the image pair for time t1 and t2 and calculating the average of the most recent TTC values, if the FOE is centered in the image; and
 (i) iteratively repeating the steps (a) to (g) for adjusting the course of movement of the mobile vehicle until the desired position is achieved.

13. A method of self-calibrating a visual time-to-contact (TTC) sensor, from claim 12, wherein the step (d) for computation of the average optical flow is accomplished by computing second partial spatial and temporal derivatives of the image brightness intensity.

14. A method of self-calibrating a visual time-to-contact (TTC) sensor, from claim 12, wherein the step (g) for determination that the FOE is centered in the image is made when the weighted global average of the horizontal and vertical components of the optical flow are below a threshold.

15. A method of self-calibrating a visual time-to-contact (TTC) sensor, from claim 12, wherein the step (e) for computation of the pan and tilt angles is accomplished by computing optical flow bias and combining it with the average optical flow.

16. A method of self-calibrating a visual time-to-contact (TTC) sensor, from claim 12, wherein the TTC value is computed in the step (g) by calculating distance from the FOE to the image point in the image plane, divided by the magnitude of the optical flow at that distance.

17. A method of self-calibrating a visual time-to-contact (TTC) sensor, from claim 12, wherein the step (a) further comprises smoothing of the input images with a Gaussian smoothing function.

18. A method of self-calibrating a visual time-to-contact (TTC) sensor, from claim 12, wherein the step (d) for computation of the average optical flow further comprises smoothing the optical flow with a Gaussian function at each pixel, at high values of the determinant, by replacing values with the weighted average of the neighborhood data.

19. A method of self-calibrating a visual time-to-contact (TTC) sensor, from claim 12, wherein no steps of pre-calibration are necessary.

20. A method of self-calibrating a visual time-to-contact (TTC) sensor, from claim 12, wherein the continuous calibration is possible regardless of which direction the mobile vehicle is pointing to.

21. A method of self-calibrating a visual time-to-contact (TTC) sensor, from claim 12, wherein the continuous calibration is possible even when the FOE of an image sequence is outside the field of view of the visual TTC sensor, or if the FOE is located within the field of view of the visual TTC sensor but not centered in the image plane.

* * * * *